(12) United States Patent
Sun et al.

(10) Patent No.: US 11,088,538 B2
(45) Date of Patent: Aug. 10, 2021

(54) MODULE OF SUPPRESSING INRUSH CURRENT, METHOD OF CONTROLLING THE SAME AND ON-BOARD BIDIRECTIONAL CHARGER USING THE SAME

(71) Applicant: Delta Electronics, Inc., Taoyuan (CN)

(72) Inventors: Hao Sun, Taoyuan (CN); Lei Chang, Taoyuan (CN); Jinfa Zhang, Taoyuan (CN)

(73) Assignee: Delta Electronics, Inc., Taoyuan (CN)

( * ) Notice: Subject to any disclaimer, the term of this patent is extended or adjusted under 35 U.S.C. 154(b) by 82 days.

(21) Appl. No.: 16/405,018

(22) Filed: May 7, 2019

(65) Prior Publication Data

US 2019/0348833 A1  Nov. 14, 2019

(30) Foreign Application Priority Data

May 9, 2018  (CN) .......................... 201810438618.4

(51) Int. Cl.
*H02M 1/42*  (2007.01)
*H02M 1/32*  (2007.01)
*H02H 9/00*  (2006.01)

(52) U.S. Cl.
CPC .............. *H02H 9/002* (2013.01); *H02M 1/42* (2013.01)

(58) Field of Classification Search
CPC .......... H02M 1/42; H02M 1/32; H02M 1/325; H02M 7/125; H02H 9/002
See application file for complete search history.

(56) References Cited

U.S. PATENT DOCUMENTS 6,353,545 B1  3/2002 Ueda
8,278,997 B1  10/2012 Kim et al.
(Continued)

FOREIGN PATENT DOCUMENTS

CN    1148865 C    5/2004
CN    106411154 A    2/2017
(Continued)

OTHER PUBLICATIONS

The EESR issued Oct. 14, 2019 by the EPO.
(Continued)

*Primary Examiner* — Gary L Laxton
(74) *Attorney, Agent, or Firm* — Qinghong Xu

(57) ABSTRACT

A module of suppressing inrush current, a method of controlling the module of suppressing inrush current and an on-board bidirectional charger using the same are provided. The on-board bidirectional charger includes a PFC-inverter module and the module of suppressing inrush current, and the module of suppressing inrush current includes a controlled switch and a suppressor of suppressing inrush current connected in parallel with the controlled switch. The charging and inverting circuits are fully multiplexed, which solves the problem that a high-power on-board charger under harsh AC power supply environment in bidirectional charging cannot provide special protection against inrush current, and can improve power density and circuit efficiency of charging and inversion, realize isolation function including reducing EMI electromagnetic interference and reducing switching interference signals, realize more convenient buck/boost functions, improve using life and performance of devices, reduce cost, and reduce the size of equipment.

14 Claims, 17 Drawing Sheets

(56) References Cited

U.S. PATENT DOCUMENTS

| | | | |
|---|---|---|---|
| 9,356,523 B2* | 5/2016 | Yoshida | H02M 3/28 |
| 2003/0035311 A1* | 2/2003 | Phadke | H02M 1/4225 |
| | | | 363/89 |
| 2003/0107859 A1* | 6/2003 | Pan | H02H 9/001 |
| | | | 361/58 |
| 2005/0017695 A1* | 1/2005 | Stanley | H02M 1/4208 |
| | | | 323/207 |
| 2008/0084718 A1* | 4/2008 | Ingman | H02M 7/062 |
| | | | 363/53 |
| 2014/0103860 A1 | 4/2014 | Kominami et al. | |
| 2016/0365806 A1 | 12/2016 | Ichihara | |
| 2017/0025962 A1 | 1/2017 | Davidson | |
| 2018/0083527 A1 | 3/2018 | Fukuda et al. | |
| 2018/0278168 A1* | 9/2018 | Brown | H02J 7/0068 |

FOREIGN PATENT DOCUMENTS

| | | | |
|---|---|---|---|
| EP | 0850504 B1 | 11/2004 | |
| WO | WO-2018128102 A1 * | 7/2018 | H02M 7/219 |

OTHER PUBLICATIONS

Third Party Observations dated Jan. 25, 2021 by the EPO.
PTC thermistors as inrush current limiters.
1st Office Action dated Apr. 7, 2021 from EP patent application No. 19173084.5.

* cited by examiner

MODULE OF SUPPRESSING INRUSH CURRENT, METHOD OF CONTROLLING THE SAME AND ON-BOARD BIDIRECTIONAL CHARGER USING THE SAME

CROSS-REFERENCE TO RELATED APPLICATIONS

This application is based upon and claims priority to Chinese Patent Application No. 201810438618.4, filed on May 9, 2018, the entire content of which is hereby incorporated by reference for all purpose.

TECHNICAL FIELD

The present disclosure relates to the field of circuits, and particularly to a module of suppressing inrush current, a method of controlling the module of suppressing inrush current and an on-board bidirectional charger using the module of suppressing inrush current.

BACKGROUND

The development of new energy-powered vehicles, especially pure electric vehicles, has brought much convenience to the style of travel and life of the people. In order to provide a bigger continue voyage course, the capacity of power batteries of the new energy-powered vehicles is increasing. In order to facilitate the use of users, it is necessary to provide high-power charging modules to charge the batteries in short time. In addition to the function of providing energy to drive vehicles, the on-board power batteries themselves are easy-to-use energy storage device, therefore, the industry has proposed an idea of using the on-board power batteries as power sources to supply power to ordinary households or industrial electrical equipment. In order to realize energy conversion from direct current (DC) to alternating current (AC), high-voltage inverters are needed. However, the size and weight of assemblies in automobiles are restricted. If the charging module and the inverter module are separately manufactured as two assemblies, it is hard to obtain an advantage in space and weight, therefore, it is reasonable to integrate the functions of charging and inverting together.

After the charging and inverter circuits are integrated together, the circuit used at the AC end must be a full-bridge structure composed of fast switches. However, fast recovery diodes used in such structure generally do not have high capacity for resisting inrush currents. Especially for application of such a high-power on-board charger that has a large bus capacitor, the AC input thereof involves plugging and unplugging of a charging plug, and the grid environment thereof is complex, a special protection function against inrush current is required.

A general circuit for suppressing inrush current adopts, for example, a manner in which a circuit of a parallel of a resistance of suppressing inrush current with a relay is connected in series on the AC side or the DC circuit. However such manner uses a mechanical switch, which causes problems as that the switch has a limited life, thus leading to a poor reliability, and is bulky in volume, and the action of the relay is too slow to realize special protection against secondary inrush current. Another way is to use controlled switches such as thyristors in the rectifier bridge of a conventional power factor correction (PFC) circuit, but the use of half-controlled devices makes the control inflexible, such that it is hard to realize the special protection function. In other manners, for example, the use of structures of both a non-isolated bidirectional circuit and a separate charging and inverting circuit, can lead to increased cost and size.

Therefore, there is a need for improving the structures of the existing circuits of suppressing inrush currents, and improving the on-board bidirectional charger using the same.

SUMMARY

The present disclosure aims to at least partly solve the problem that the conventional circuit of suppressing inrush current cannot realize providing special protection against inrush current for a high-power on-board charger under harsh AC power supply environment in bidirectional charging at a low cost and a smaller volume, so as to improve power density of the circuit of suppressing inrush current and the on-board bidirectional charger.

According to the first aspect of the present disclosure, module of suppressing inrush current used in an on-board bidirectional charger is provided, wherein:

the on-board bidirectional charger includes a PFC-inverter module configured to convert an AC power into a DC power or convert the DC power into the AC power, the PFC-inverter module is connected to an AC input, a positive DC bus and a negative DC bus of the on-board bidirectional charger, and the PFC-inverter module includes a bus capacitor connected between the positive DC bus and the negative DC bus; and the module of suppressing inrush current is connected in series with the bus capacitor between the positive DC bus and the negative DC bus, and the module of suppressing inrush current includes a controlled switch and a suppressor of suppressing inrush current connected in parallel with the controlled switch.

According to an embodiment of the disclosure, the controlled switch is a transistor.

According to an embodiment of the disclosure, the transistor is a MOSFET

According to an embodiment of the disclosure, the MOSFET is a SiC MOSFET or GaN MOSFET.

According to an embodiment of the disclosure, the suppressor of suppressing inrush current is a positive temperature coefficient resistor.

According to an embodiment of the disclosure, wherein the on-board bidirectional charger further comprises an isolated bidirectional resonant zero voltage switching DC/DC module which is electrically connected to the positive DC bus and the negative DC bus.

According to the second aspect of the present disclosure, a method of controlling a module of suppressing inrush current used in an on-hoard bidirectional charger is provided, wherein:

the on-board bidirectional charger includes a PFC-inverter module configured to convert an AC power into a DC power or convert the DC power into the AC power, the PFC-inverter module is connected to an AC input, a positive DC bus and a negative DC bus of the on-board bidirectional charger, and the PFC-inverter module includes a bus capacitor connected between the positive DC bus and the negative DC bus; and the module of suppressing inrush current is connected in series with the bus capacitor between the positive DC bus and the negative DC bus, and the module of suppressing inrush current includes a controlled switch and a suppressor of suppressing inrush current connected in parallel with the controlled switch, and the method includes:

controlling the on-board bidirectional charger to receive an AC input power and charge the bus capacitor by a limited current through the suppressor of suppressing inrush current, wherein the controlled switch is in an off-state during the charging;

when a voltage of the bus approaches a peak value of a voltage of the AC input power, turning on the controlled switch;

controlling the PFC-inverter module to charge the bus capacitor by a constant current of a first AC current protection limit; and when the voltage of the bus approaches a set voltage, increasing the first AC current protection limit to a normal operation limit, and charging a voltage of the bus capacitor to the set voltage.

According to an embodiment of the disclosure, the step of charging the bus capacitor by a constant current of a first AC current protection limit further includes:

when the peak value of the voltage of the AC input power exceeds the voltage of the bus capacitor during the charging by the constant current, determining whether the current of the AC input power exceeds a second AC current protection limit;

when the current of the AC input power exceeds the second AC current protection limit, turning off the controlled switch, and charging the bus capacitor by the limited current through the suppressor of suppressing inrush current; and when the voltage of the bus approaches or is higher than the peak value of the voltage of the AC input power again, turning on the controlled switch again, and charging the bus capacitor by the limited current of the first AC current protection limit.

According to an embodiment of the disclosure, the second AC current protection limit is higher than the first AC current protection limit.

According to an embodiment of the disclosure, a voltage generated by a current of the second AC current protection limit flowing through the module of suppressing inrush current is lower than a voltage that the DC bus can withstand.

According to an embodiment of the disclosure, after the step of charging a voltage of the bus capacitor to the set voltage, the method further includes:

when the voltage of the AC input power increases, keeping the controlled switch on.

According to the third aspect of the present disclosure, an on-board bidirectional charger is provided, and the on-board bidirectional charger includes:

a PFC-inverter module, configured to convert an AC power into a DC power or convert the DC power into the AC power, the PFC-inverter module is connected to an AC input, a positive DC bus and a negative DC bus of the on-board bidirectional charger, and the PFC-inverter module includes a bus capacitor connected between the positive DC bus and the negative DC bus; and a module of suppressing inrush current, configure to suppressing inrush current when the bus capacitor of the on-board bidirectional charger is charged, the module of suppressing inrush current is connected in series with the bus capacitor between the positive DC bus and the negative DC bus, and the module of suppressing inrush current includes a controlled switch and a suppressor of suppressing inrush current connected in parallel with the controlled switch.

According to an embodiment of the disclosure, the on-board bidirectional charger further includes:

a bidirectional resonant zero voltage switching DC/DC module, configured to boost or buck a voltage from the positive DC bus and the negative DC bus or a voltage from an on-board battery, wherein the bidirectional resonant zero voltage switching DC/DC module is connected to the positive DC bus, the negative DC bus and a positive terminal and a negative terminal of the on-board battery.

According to an embodiment of the disclosure, the controlled switch is a transistor.

According to an embodiment of the disclosure, the transistor is a MOSFET

According to an embodiment of the disclosure, the MOSFET is a SiC MOSFET or GaN MOSFET.

According to an embodiment of the disclosure, the suppressor of suppressing inrush current is a positive temperature coefficient resistor.

According to an embodiment of the disclosure, the bidirectional resonant zero voltage switching DC/DC module includes:

a transformer including a primary winding and a secondary winding;

at least one primary-side bridge-arms, wherein a DC positive input terminal of each of the primary-side bridge-arms is connected to the positive DC bus, a DC negative input terminal of each of the primary-side bridge-arms is connected to the negative DC bus, and a midpoint of each of the primary-side bridge-arms is connected to a corresponding terminal of the primary winding of the transformer;

at least one secondary-side bridge-arms, wherein a DC positive output terminal of each of the secondary-side bridge-arms is connected to a positive terminal of the on-board battery, and a DC negative output terminal of each of the secondary-side bridge-arms is connected to a negative terminal of the on-board battery, and a midpoint of each of the secondary-side bridge-arms is connected to a corresponding terminal of the secondary winding of the transformer; and at least one resonant tank, connected in series between the primary winding of the transformer and the midpoint of at least one of the primary-side bridge-arms, or between the secondary winding of the transformer and the midpoint of at least one of the secondary-side bridge-arms.

According to an embodiment of the disclosure, the on-board bidirectional charger includes a plurality of bidirectional resonant zero voltage switching DC/DC modules connected in parallel.

According to an embodiment of the disclosure, a resonant capacitor is connected in series between the midpoint of one of the primary-side bridge-arms and the primary winding of the transformer, and another resonant capacitor is connected in series between the midpoint of one of the secondary-side bridge-arms and the secondary winding of the transformer.

According to an embodiment of the disclosure, the on-board bidirectional charger further includes:

a sampling and encoding module, configured to acquire a voltage and a current of an AC input power from the PFC-inverter module, and to acquire a voltage of the bus from the module of suppressing inrush current:

an isolator, configured to isolate signals acquired from the sampling and encoding module; and a controller, configured to control the controlled switch in the module of suppressing inrush current, based on signals acquired from the isolator.

According to an embodiment of the disclosure, the controller communicates with a vehicle controller via an isolated CAN module.

By adopting the circuit (module) of suppressing inrush current, the method of controlling the circuit (module) of suppressing inrush current and the on-board bidirectional charger using the circuit (module) of suppressing inrush current, the charging and inverting circuits are fully multiplexed, which can improve power density and circuit efficiency of charging and inversion, realize isolation function including reducing EMI electromagnetic interference and reducing switching interference signals, realize more convenient buck/boost functions, improve using life and performance of devices, reduce cost, and reduce the size of equipment. Particularly, the solution of the present disclosure can provide protection against secondary inrush current for the on-board bidirectional charger in the case of complicated environment of power grid

BRIEF DESCRIPTION OF THE DRAWINGS

The above and other features and advantages of the present disclosure will become more apparent by describing exemplary embodiments thereof with reference to accompanying drawings.

DETAILED DESCRIPTION

Figure 1:
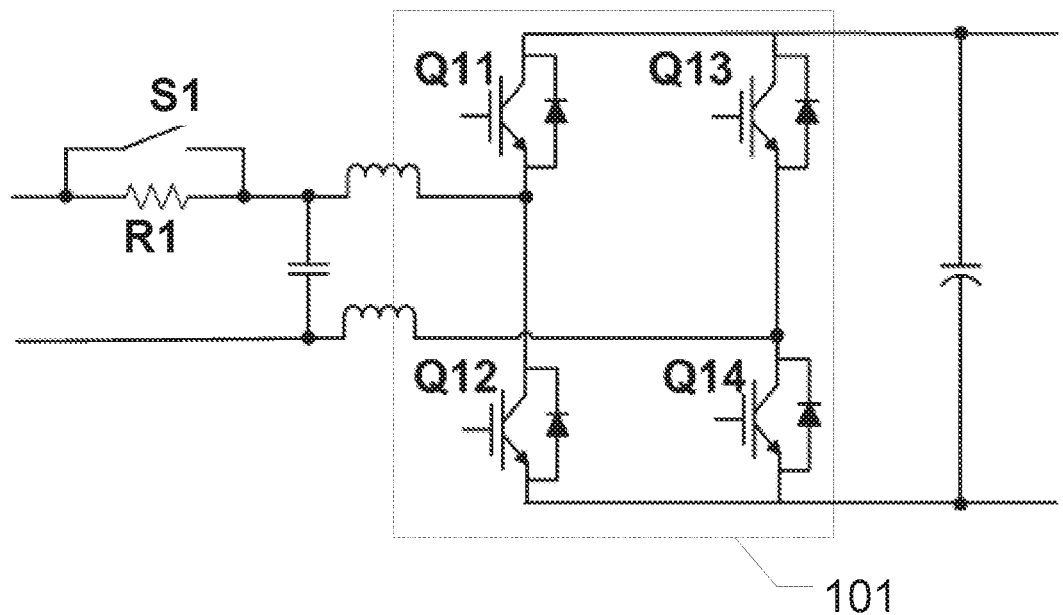
FIG. 1 is a structural diagram of a circuit of suppressing inrush current by using a relay in prior art.

Exemplary embodiments will now be described more fully with reference to the accompanying drawings. However, the exemplary embodiments can be implemented in a variety of forms, and should not be construed as being limited to the embodiments set forth herein. Rather, these embodiments are provided so that the present disclosure will be thorough and complete and the concepts of the exemplary embodiments are fully conveyed to those skilled in the art. In the drawings, the size or shape of components may be exaggerated or deformed for clarity. The same reference numerals in the drawings denote the same or similar structure, and thus their detailed description will be omitted.

Furthermore, the described features, structures or characteristics may be combined in any suitable manner in one or more embodiments. In the following description, numerous specific details are set forth to provide a thorough illustration to the embodiments of the disclosure. However, those skilled in the art will appreciate that the technical solution of the disclosure may be practiced without one or more of the specific details, or may be practiced by employing other structures, components, steps, methods, etc. In other instances, well-known structures, components, method or operations are not shown or described in detail to avoid obscuring the respective aspects of the disclosure.

An on-board charger is used to convert the grid power into DC power that can be received by an on-board high-voltage battery, to charge the on-board high-voltage battery, therefore, in terms of structures, there is typically a PFC preceding-stage, which is connected to the AC grid, and a DC/DC stage, which is connected to the battery, for adjusting the charging power. In an on-board bidirectional charger, the PFC stage not only needs to realize PFC function, but also needs to realize inverter function, so the preceding-stage is called a PFC-inverter module.

When the on-board bidirectional charger is charging, its input is an AC voltage. The input is usually fed from the power grid, which needs to cope with different grid voltages, various grid faults and dynamic phenomena, and the vehicle is connected with a charging pile in a manner that the input is a charging plug, so, there may be a problem of timing coordination and uncertainty of plugging and unplugging state, therefore, the design of PFC-inverter module needs to specially consider various possible harsh operating conditions so as to ensure reliability of the circuits. When the on-board bidirectional charger supplies power to outside, the inverting-function of the PFC-inverter module is realized by taking the on-board high-voltage battery as an energy source, and after the energy source is converted into an AC voltage, the AC voltage is output to drive general electrical equipment. At this time, the PFC-inverter module supplies energy to outside through the discharging plug. It can be seen that the application scenario of the on-board bidirectional charger is far more complicated than the general on-board charger. Especially for the PFC-inverter module for multiplexing of charging and inverting, since it needs to take into account the functions of both inverting and rectifying, generally it can only uses a totem pole structure composed of high-speed switches. However, the fast recovery diode used in conjunction with the high-speed switch or the inversely-paralleled diode parasitized in the switch itself generally does not have a strong capability of withstanding inrush current, so they need special protection.

FIG. 1 is a structural diagram of a circuit of suppressing inrush current by using a relay in prior art.

In the circuit of suppressing inrush current, a circuit of a parallel of a resistance R1 of suppressing inrush current with a relay S1 is connected in series on the AC side or the DC circuit of the PFC module 101 composed of switches Q11-Q14, to realize the function of providing impedance in the charging circuit having a inrush current, so as to ultimately realize suppression of the inrush current. However such manner uses a mechanical switch, which causes problems as that the switch has a limited life, thus leading to a poor reliability, and is bulky in volume, and the action of the relay is too slow to realize special protection against secondary inrush current.

Figure 2:
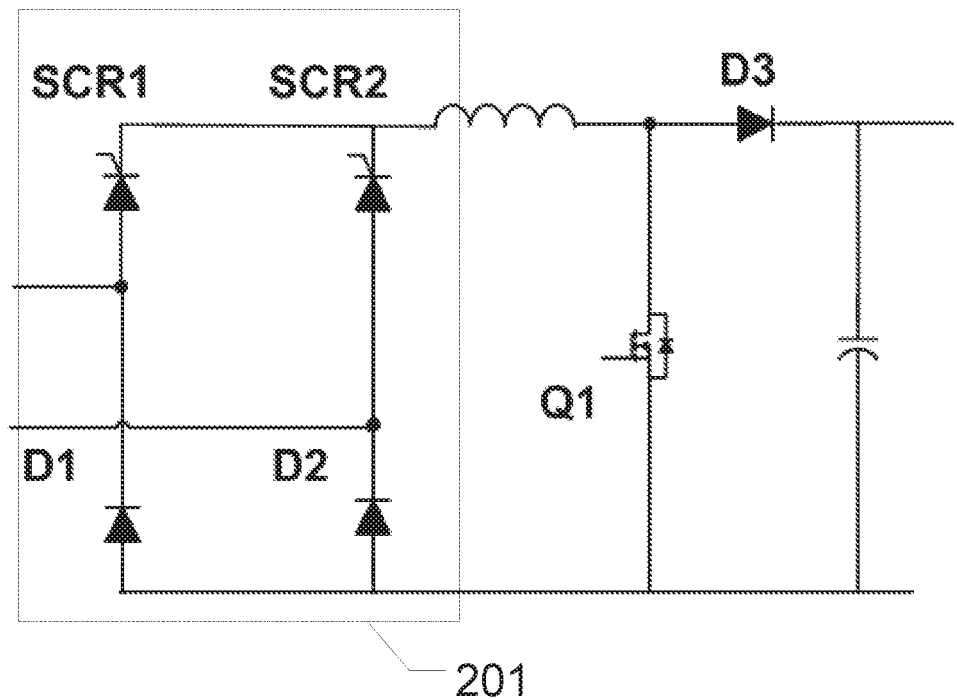
FIG. 2 is a structural diagram of another circuit of suppressing inrush current not by using a relay in prior art.

FIG. 2 is a structural diagram of another circuit of suppressing inrush current not by using a relay in prior art. In this solution, controlled switches SCR1 and SCR2 such as thyristors and uncontrolled switches D1 and D2 such as diodes are adopted in a rectifier bridge 201 preceding a conventional PFC circuit composed of a switch Q1 and a diode D3. The suppression of inrush current is realized by gradually increasing the conduction angles of the thyristors SCR1 and SCR2. Such manner actually does not need any resistance of suppressing inrush current. However, due to the use of half-controlled device, the control is not flexible, so it is hard to realize the function of special protection.

Figure 3:
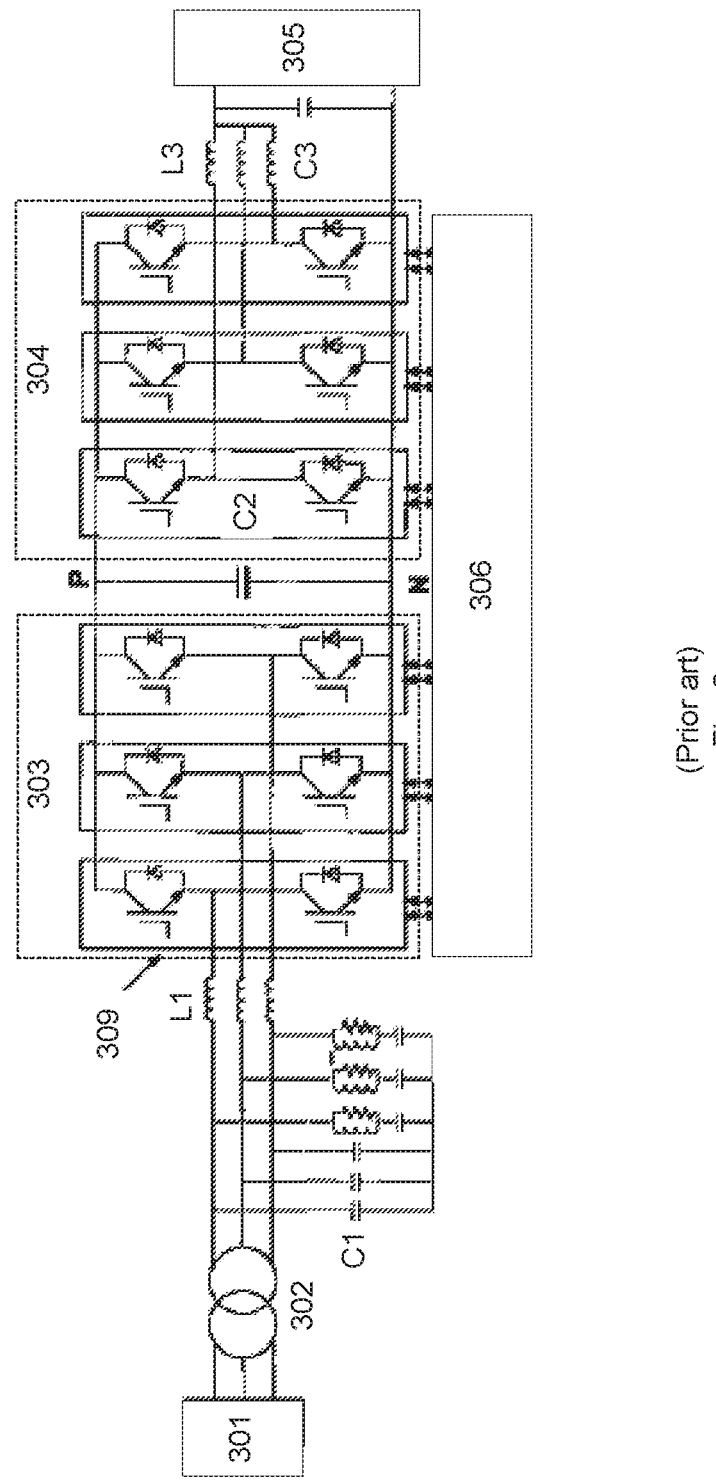
FIG. 3 is a structural diagram of a bidirectional circuit in prior art.

On-board bidirectional chargers in prior art mainly include the following structures:

FIG. 3 is a structural diagram of a bidirectional circuit in prior art, which is a non-isolated bidirectional circuit. When the circuit is used for charging, AC power input from the power grid 301 is converted by the transformer 302, then passes through a preceding-stage, i.e., a bidirectional active rectification module 303 and a post-stage, i.e., a DC/DC conversion module 304 respectively, and output to a battery 305. The bidirectional active rectification module 303 is composed of a plurality of power electronic component modules 309. When the circuit is used for inverting, power of the battery 305 is reversely output to the power grid 301 through the DC/DC conversion module 304, the bidirectional active rectification module 303 and the transformer 302. Under the control of a controller 306, the circuit can realize bidirectionally flowing of energy between the AC and the DC, its input and output adopt switch modules of the same structure, and its structure is simple and easy to be realized. Other components, such as filtering capacitors C1 and C3, a bus capacitor C2, inductors L1 and L3, and the like, are well-known elements, which are not described in details. The DC/DC conversion module in FIG. 3 can only realize the function of making the voltage buck when charging, and can only realize the function of making the voltage boost when inverting, so the bus voltage must be higher than the battery voltage, which provides high requirement on the withstand voltage levels of the switching devices and the bus capacitors. At the same time, the non-isolated structure has a potential safety hazard. In order to compensate for such defects, it needs to use reinforced insulation in a large area of the whole machine, so the cost is high.

Figure 4:
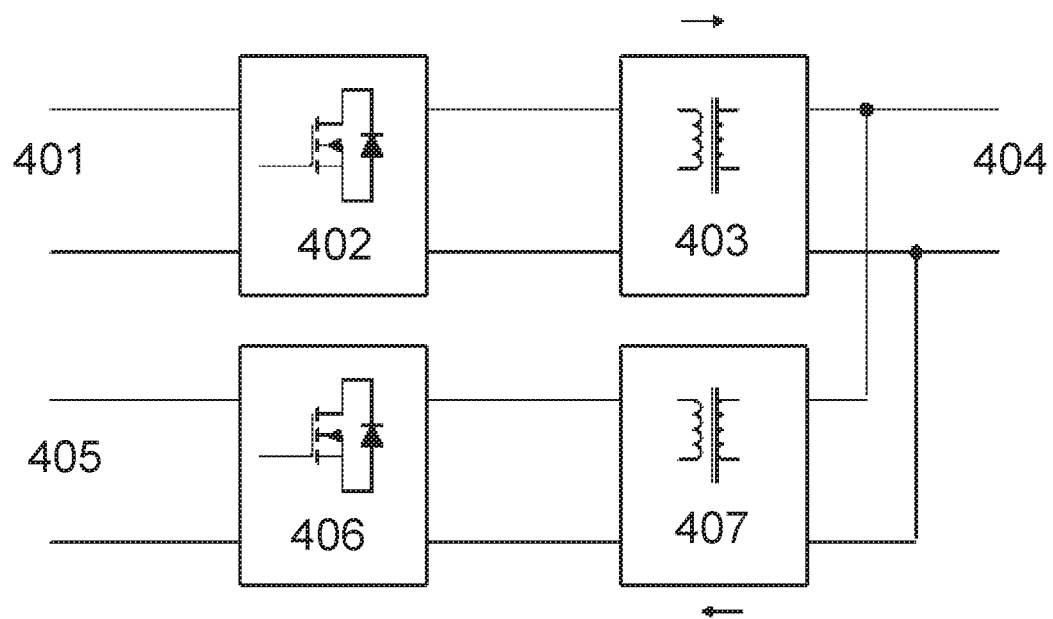
FIG. 4 is a structural diagram of another type of bidirectional circuit in prior art.

FIG. 4 is a structural diagram of another type of bidirectional circuit in prior art, wherein the charging and inverting circuits are separate. A high-voltage DC bus is used to charge an energy storage device such as a battery, or receive DC power from the energy storage device. When charging the energy storage device, the power grid 401 is connected to the high-voltage DC (HVDC) bus 404 through a PFC module 402 and a DC/DC module 403 respectively. When the energy storage device is used to supply power to an external load 405, the high-voltage DC bus 404 is connected to the external load 405 through a DC/DC module 407 and an inverter module 406. Under such structure, each circuit module only needs to realize one-direction transfer of energy, so the selection range of topologies is wide, and efficiency optimization in both directions is easy to be realized. However, its disadvantage is that it does not realize multiplexing of power circuits, and it is hard to increase power density. For a scenario of on-board application, due to the limited space in a vehicle, high power density is a necessary condition, therefore, such structure has no apparent advantage in the application of on-board bidirectional chargers.

Figure 5:
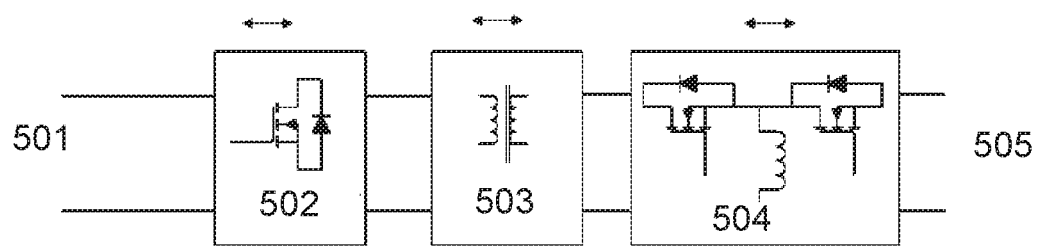
FIG. 5 is a structural diagram of further another type of bidirectional circuit in prior art.

FIG. 5 is a structural diagram of further another type of bidirectional circuit in prior art. In such structure, circuits of charging and inverting are fully multiplexed, but a three-stage structure is adopted. Between a power grid (or load) 501 and a high-voltage DC bus 505, a PFC-inverter module 502, a first-stage DC/DC module 503 and a second-stage DC/DC module 504 are sequentially connected respectively. Generally, the voltage of the DC bus in the structure of bidirectional circuit in FIG. 5 is stable, and the first-stage DC/DC module 503 is a high-frequency resonant DC/DC module which does not participate in voltage regulation and is only used for isolation. The function of voltage regulation is realized by the second-stage DC/DC module 504. This arrangement has the advantage that the first-stage DC/DC module 503 can operate in an optimal resonant state, resulting in high efficiency of bidirectional operating. However, the presence of the post-stage DC/DC module 504 makes the circuit structure relatively complex and in turn introduces new losses. Moreover, the total number of devices increases, which may negatively affect cost and size.

To this end, the present disclosure proposes a novel module of suppressing inrush current, a method of controlling the module of suppressing inrush current and an on-board bidirectional charger using the module of suppressing inrush current.

In order to improve power density of the on-board bidirectional charger, the on-board bidirectional charger according to an embodiment of the present disclosure adopts a manner in which the charging and inverting circuits are completely multiplexed. In order to reduce the cost of suppressing EMI (electromagnetic interference), reduce the level of switching interference signal, improve operating efficiency, realize the purpose of buck/boost and isolation, the bidirectional DC/DC circuit in the structure of the on-board bidirectional charger adopts a bidirectional resonant zero voltage switching DC/DC circuit (module) and a control manner thereof, for which Delta's U.S. Pat. No. 9,490,704 can be referred to.

On the basis of the above, in order to improve the reliability of the product in the application of the on-board bidirectional charger, according to an embodiment of the present disclosure, the structure of the on-board bidirectional charger adopts a circuit of suppressing inrush current without a relay, and provides a method of controlling the circuit, to ensure safety of devices under harsh AC power environment. It should be noted that, such manner of suppressing inrush current without a relay can be applied to the on-board charger, especially to the on-board bidirectional charger, but is not limited to the on-hoard charger.

Figure 6:
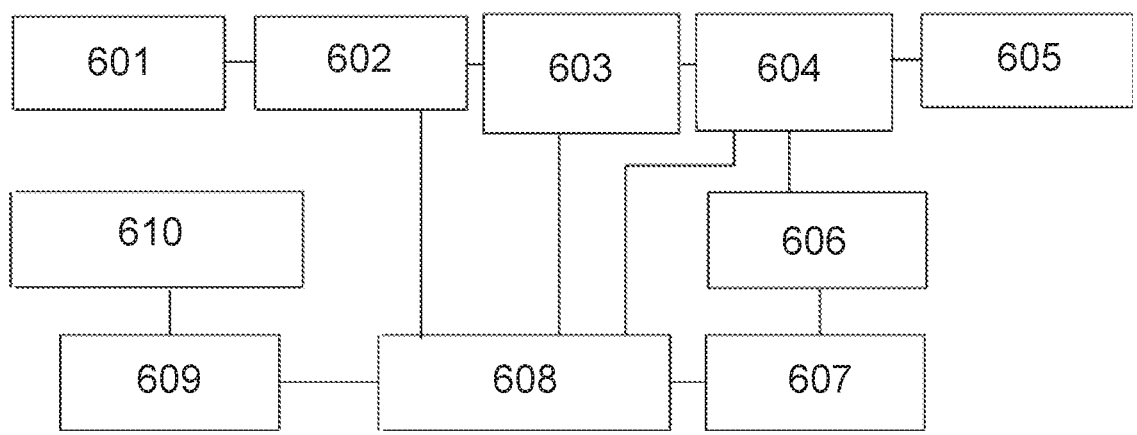
FIG. 6 is an exemplary structural block diagram of an on-board bidirectional charger according to an embodiment of the present disclosure.

FIG. 6 is an exemplary structural block diagram of an on-board bidirectional charger according to an embodiment of the present disclosure, which shows a basic structure of the on-board bidirectional charger according to an embodiment of the present disclosure. As shown in FIG. 6, an AC input/output circuit 601 of the on-board bidirectional charger is connected to a PFC-inverter module 602, to input AC power to the PFC-inverter module 602 or obtain AC power from the PFC-inverter module 602. The PFC-inverter module 602 is a module integrated with a PFC and an inverter, to convert AC power to DC power or convert DC power to AC power. A module 603 of buffering energy and suppressing inrush current is connected with the PFC-inverter module 602 in series through the positive and negative DC buses (BUS), wherein the module 603 of buffering energy and suppressing inrush current is composed of a bus capacitor and a circuit (module) of suppressing inrush current without a relay. It should be noted that, the module of suppressing inrush current without a relay in the module 603 of buffering energy and suppressing inrush current is not necessarily connected in series in the branch of the bus capacitor. A bidirectional resonant zero voltage switching DC/DC module 604 is connected in series with the module 603 of buffering energy and suppressing inrush current, to converts the voltage from the positive DC bus and the negative DC bus of the PFC-inverter module 602 or the voltage from the on-board rechargeable battery. The bidirectional resonant zero voltage switching DC/DC module 604 is connected to the positive and negative terminals of the on-board rechargeable battery via a DC input/output circuit 605.

A sampling and encoding module 606 is configured to sample and encode the AC input voltage and current acquired from the PFC-inverter module 602 and the bus voltage and bus current on the module 603 of buffering energy and suppressing inrush current. An isolator 607 is configured to isolate signals acquired from the sampling and encoding module 606. A controller 608 is configured to control a controlled switch in the module 603 of buffering energy and suppressing inrush current, based on signals acquired from the isolator 607, to adjust the operations of the PFC-inverter module 602, the module 603 of buffering energy and suppressing inrush current and the bidirectional resonant zero voltage switching DC/DC module 604. The sampling and encoding module 606, the isolator 607 and the controller 608 may be separate chips, or may be a controller of a control structure of a multi-stage-isolated switching power supply based on a single control chip, a common digital isolation chip or a preceding-stage sampling and encoding module. In an embodiment, since the primary-sides of the PFC-inverter module 602 and the bidirectional resonant zero voltage switching DC/DC module 604 have a large number of switches and sampling signals, the controller 608 is disposed on the primary-side of the system.

In terms of control, since both the AC voltage and the battery voltage operate within a wide range, in order to ensure the certainty of operating conditions of devices on the primary-side, a control manner of stabilizing the bus voltage is adopted. That is to say, during charging operation, the PFC-inverter module 602 regulates (stabilizes) the bus voltage, the regulated (stabilized) bus voltage is converted by the bidirectional resonant zero voltage switching DC/DC module 604 and then be isolated and transmitted to the on-board battery, to charge the battery. During inverting operation, the bidirectional resonant zero voltage switching DC/DC module 604 receives the battery voltage as an input, and outputs a regulated (stabilized) DC bus voltage. The regulated (stabilized) bus voltage is inverted by the PFC-inverter module 602 and supplied to power consumption equipment by the AC input/output 601.

Such manner in which the bus voltage is regulated will result in high voltage regulation requirements for the DC/DC module, and thus leading to efficiency losses in extremely high voltage condition and in extremely low voltage condition. However, for devices associated with the DC bus, the withstand voltage levels of the devices can be low, the selection range of the devices can be wide, and a relatively-stable DC bus voltage can adapt to voltage fluctuation of the power grid well. The charging of a battery usually has the following characteristics: that is, after the charging by the constant current starts, the battery voltage will quickly rise from the extremely-low empty-cell voltage to around the rated voltage, and the voltage is maintained until the battery is almost fully charged; and in the last phase of charging, the voltage rises rapidly to a very high voltage. General battery management system (BMS) determines whether the battery is fully charged by the rising rate of the battery voltage or the turning point of the battery voltage at which the battery voltage stops rising and begin to drop. By studying such characteristics, it is known that, during the period of battery charging, the battery voltage is almost maintained within a relatively-constant range. By utilizing such characteristic, as long as the on-board bidirectional charger can ensure high efficiency during such period, the equivalent high efficiency during the whole charging process can be ensured.

In designing the bidirectional resonant zero voltage switching DC/DC module 604, when it needs to ensure the rated voltage of the battery, the bidirectional resonant zero voltage switching DC/DC module 604 is configured to operate near the resonance point, to obtain the maximum efficiency. This illustrates that, compared with the bidirectional charging structure as shown in FIG. 5, within the whole voltage range, the bidirectional resonant zero voltage switching DC/DC module 604 in accordance with the embodiment of the present disclosure is not as efficient as the resonant DC/DC module that is only used for isolation, but the bidirectional resonant zero voltage switching DC/DC module 604 in accordance with the embodiment of the present disclosure has not introduced loss by the second-stage DC/DC module 504 shown in FIG. 5. The optimized design of the bidirectional resonant zero voltage switching DC/DC module 604 can make the overall efficiency of the on-board bidirectional charger relatively high within the whole voltage range as much as possible, but it is hard to match the three-stage structure in peak efficiency. Therefore, for the charging process, it is a more economical option to make the circuit of two-stage structure including the PFC-inverter module and the bidirectional resonant soft-switch DC/DC module work under the most efficient in the condition of rated voltage of the battery.

The main structure of the above on-board bidirectional charger realizes bidirectional flow of power and the control of the loop of the circuits. The AC input/output circuit 601 may further include an input EMI filter, and the DC input/output circuit 605 may further include an input EMI filter either. A vehicle controller 610 is a low-voltage side controller being configured to communicate with the entire vehicle, and is responsible for communicating with the whole vehicle, and for realizing both the control of operating direction and the handling of fault of the system. In an embodiment of the present disclosure, communication between the vehicle controller 610 and the controller 608 may be realized via an isolated CAN (Controller Area Network) module 609.

Figure 7:
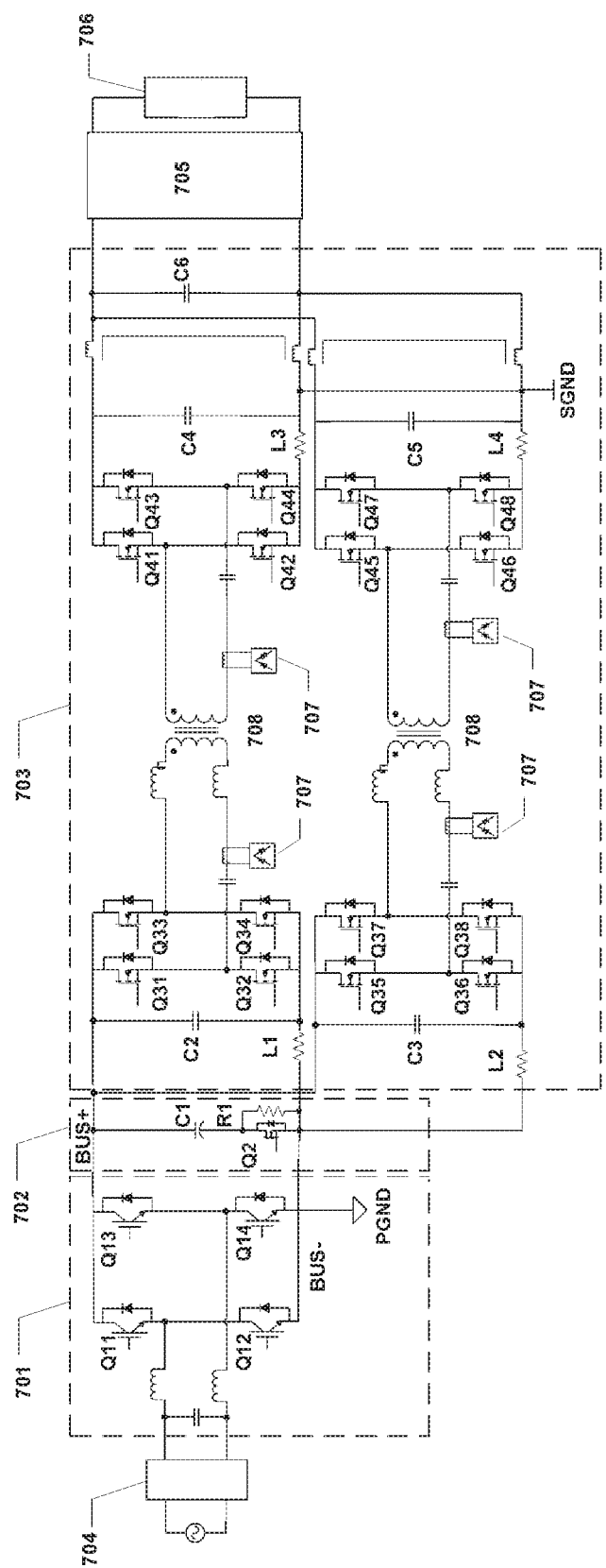
FIG. 7 is an exemplary structural diagram of the main power circuit of an on-board bidirectional charger according to an embodiment of the present disclosure.

FIG. 7 is an exemplary structural diagram of the main power circuit of an on-board bidirectional charger according to an embodiment of the present disclosure.

A PFC-inverter module 701 is a full-bridge circuit composed of the switches Q11-Q14, wherein the port connected to the midpoints of the bridge-arms of the full-bridge circuit is connected to the AC end of the PFC-inverter module 701 through two inductors, a capacitor and a filter 704. When being in charging operation, the AC end is connected to the power grid to provide energy to the on-board bidirectional charger. When being in inverting operation, the AC end is connected to power consumption equipment, such that the on-board bidirectional charger provides an AC voltage for the power consumption equipment.

The module 702 of buffering energy and suppressing inrush current includes a bus capacitor C1 and a module of suppressing inrush current without a relay. The bus capacitor C1 is connected between the positive DC bus BUS+ and the negative DC bus BUS−. The module of suppressing inrush current without a relay is a structure of a parallel of a suppressor R1 of suppressing inrush current with a controlled switch Q2, the structure is placed in the charging circuit loop of the bus capacitor C1 being charged through the AC end and is connected in series with the bus capacitor C1, wherein the suppressor R1 of suppressing inrush current can be a limit impedance. In the present embodiment, the structure is placed at the negative terminal of the bus capacitor C1 and in series with the bus capacitor C1, thereby providing sufficient impedance in the charging circuit loop to suppress the inrush current when the bus capacitor C1 is charged by the AC end.

As shown in FIG. 7, the basic composition of an isolated bidirectional resonant zero voltage switching DC/DC module 703 includes: a primary-side bridge-arm composed of switches Q31, Q32, Q33 and Q34 (or Q35, Q36, Q37 and Q38); a resonant tank 707, a transformer 708 and a secondary-side bridge-arm composed of switches Q41, Q42, Q43 and Q44 (or Q45, Q46, Q47 and Q48). In addition, a filter circuit composed of a capacitor C2 and an inductor L1 (or C3 and L2) may be connected between the primary-side bridge-arm and the PFC-inverter module 701.

The number of primary-side bridge-arm of the isolated bidirectional resonant zero voltage switching DC/DC module 703 is at least one, wherein the positive input terminal of each bridge-arm is connected to the positive DC bus BUS+ of the PFC-inverter module 701, the negative input terminal of each bridge-arm is connected to the negative DC bus BUS− of the PFC-inverter module 701, and the midpoint of each bridge-arm is connected to the corresponding terminal of the primary winding of the transformer 708. The number of secondary-side bridge-arm of the isolated bidirectional resonant zero voltage switching DC/DC module 703 is at least one as well, wherein the positive output terminal of each bridge-arm is connected to the positive terminal of the on-board battery 706, the negative output terminal of each bridge-arm is connected to the negative terminal of the on-board battery 706, and the midpoint of each bridge-arm is connected to the corresponding terminal of the secondary winding of the transformer 708. The positive input terminal and the negative input terminal of the secondary-side bridge-arm may further be filtered by an on-board EMI filter 705 and connected to the on-board battery 706. In addition, a filter circuit composed of a capacitor C4 and an inductor L3 (or C5 and L4), a common mode inductor and a capacitor C6 may be connected between the secondary-side bridge-arm and the on-board EMI filter 705.

The number of resonant tanks 707 is at least two, which are respectively connected in series between the primary winding of the transformer 708 and the midpoint of at least one of the primary-side bridge-arms, and between the secondary winding of the transformer 708 and the midpoint of at least one of the secondary-side bridge-arms.

In order to realize bidirectional operation, both the primary-side and secondary-side bridge-arms use active switches. The embodiment adopts a structure of a parallel of two bidirectional resonant zero voltage switching DC/DC module 703, so as to use switches having relatively small capacity. In order to realize equivalent bidirectional Operating characteristics, the resonant tank of the bidirectional resonant zero voltage switching DC/DC module 703 is an LC series resonant structure.

Since the full-bridge circuit is adopted, it needs to consider the problem that the DC component presenting in the AC output of the full-bridge circuit causes the transformer 708 to be saturated, therefore, a resonant capacitor is arranged on each of the primary and secondary sides of the transformer 708, and the total resonant capacitance is the series of the two resonant capacitors, which ensures that the transformer 708 has a DC isolation capacitor in either direction of operation. The resonant capacitor on the primary-side is connected in series between the midpoint of one of the bridge-arms on the primary-side and the primary winding of the transformer 708, and the resonant capacitor of the secondary-side is connected in series between the midpoint of one of the bridge-arms on the secondary-side and the secondary winding of the transformer 708. In FIG. 7, PGND is the power ground, and SGND is the signal ground.

The following will describe the application of the module of suppressing inrush current without a relay in an on-board bidirectional charger and the control method thereof in details.

The module of suppressing inrush current without a relay in the embodiment of the present disclosure is particularly suitable for an on-board bidirectional charger. Because vehicle application involves frequent vibration, and the commonly-used relays are in mechanical structures, which may produce mechanical fatigue after long-term vibration, it is not conducive to product life. Especially for relays with high power levels, their contact structure is heavier, so they are more easily to suffer mechanical damage. Further, contactors of special structures are usually large in size, which are hard to be arranged in a compact on-board charger, and have high costs. Further, due to the large amount of uncertainty presenting in the application environment of the AC end of the on-board charger, a secondary inrush current may arise. It needs to provide special protection in the case of low DC bus voltage as well, so as to improve the reliability of the on-board charger.

For the above reasons, the use of a module of suppressing inrush current without a relay is an economical and reliable choice. The commonly-used circuit of suppressing inrush current without a relay adopts thyristors as a current-limiting measure. However, due to the requirement of bidirectional operation, it must use a structure without a bridge, so the manner of thyristor is not suitable here.

Figure 8:
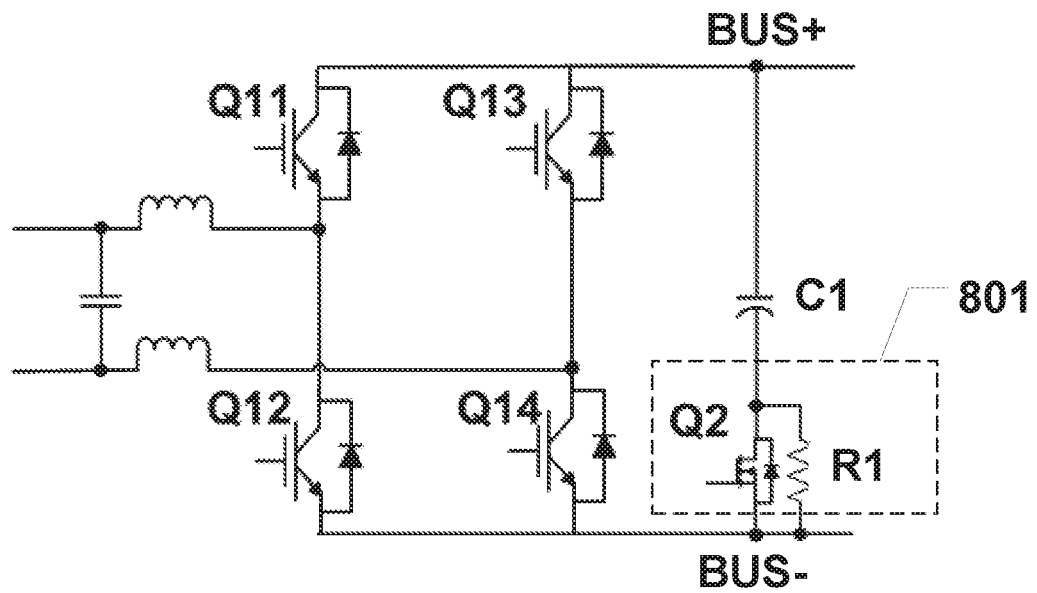
FIG. 8 is a structural diagram of a module of suppressing inrush current according to an embodiment of the present disclosure.

To this end, the embodiment of the present disclosure proposes a module of suppressing inrush current without a relay applied to an on-board bidirectional charger. FIG. 8 is a structural diagram of a module of suppressing inrush current according to an embodiment of the present disclosure, which shows an exemplary circuit structure of a module 801 of suppressing inrush current according to an embodiment of the present disclosure.

The module 801 is arranged in a charging circuit loop, through which a switching-rectifying power source constituted by the switches Q11-Q14 charges the DC bus capacitor C1, to provide an impedance of suppressing inrush current when needed. The module 801 of suppressing inrush current is composed of a suppressor R1 of suppressing inrush current and a bypassing controlled switch Q2, and the bypassing controlled switch Q2 is connected in parallel with the suppressor R1 of suppressing inrush current. The suppressor R1 of suppressing inrush current generally adopts an impedance of suppressing inrush current.

Figure 9:
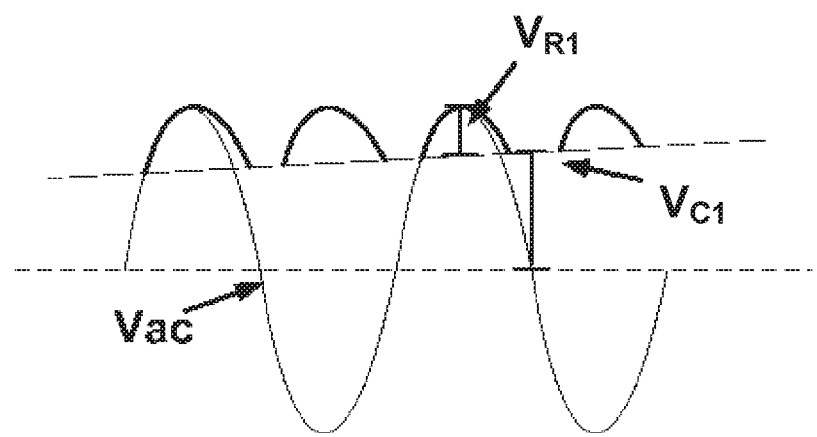
FIG. 9 is a schematic diagram of the composition of a bus voltage during the charging of a bus capacitor, and of the relationship between the bus voltage and the AC voltage.

Further, in order to facilitate the detection of bus voltage at the minimum cost, in the present embodiment, the suppressor R1 of suppressing inrush current is a positive temperature coefficient (PTC) resistance, and the bypassing controlled switch Q2 is a transistor, particularly is a MOSFET (Metal-Oxide-Semiconductor Field-Effect Transistor) with a low on-resistance. In one embodiment, the MOSFET is a SiC MOSFET or GaN MOSFET. One end of the module 801 of suppressing inrush current formed by the above two elements is connected in series with the negative terminal of the bus capacitor C1, the other end of the module 801 is connected to the negative DC bus BUS−, and the positive terminal of the bus capacitor C1 is connected to the positive DC bus BUS+. The advantage of adopting a MOSFET lies in that: during the charging period, when the AC voltage is lower than the bus voltage, the diodes in the full-bridge of the switches withstand the reverse voltage, and block the connection between the DC bus and the AC input. However, the bus capacitor can discharge through the inversely-paralleled diode of the MOSFET to a resistor (such as a sampling resistor, etc.) connected between the positive DC bus and the negative DC bus. At this time, the bus voltage is equal to the voltage across the bus capacitor, so the voltage of the bus capacitor and the voltage of the entire DC bus can be detected only via one set of voltage detection circuit. In one embodiment, the bus voltage obtained at the zero crossing of the AC voltage is taken as the capacitor voltage, as shown in FIG. 9. FIG. 9 is a schematic diagram of the composition of a bus voltage during the charging of a bus capacitor, and of the relationship between the bus voltage and the AC voltage. In the schematic diagram of the composition of the bus voltage during the charging of the bus capacitor C1, and of the relationship between the bus voltage and the AC voltage, Vac is the AC voltage of the AC input obtained from the PFC-inverter module, and the bus voltage is a sum of two parts $V_{R1}$ and $V_{C1}$, where $V_{R1}$ is the voltage across the suppressor R1 of suppressing inrush current, and $V_{C1}$ is the voltage across the bus capacitor C1.

Without a relay, the module 801 of suppressing inrush current can improve mechanical reliability of the on-board bidirectional charger without worrying about aging of contact spring of the relay. Further, the switching speed of the switch Q2 is much faster than the relay.

According to the embodiment of the present disclosure, a method of controlling the module 801 of suppressing inrush current of the on-board bidirectional charger is further proposed by using the characteristic of fast switching speed of the switch Q2, which can provide protection against secondary inrush current for the on-board bidirectional charger in the case of complicated environment of power grid.

Generally, the voltage of power grid fluctuates within a range of plus or minus 10%. However, because the working conditions of the power grid is complicated, especially in a power grid with relatively small capacity, the voltage often fluctuates rapidly with large amplitude. Especially for new energy-powered vehicles, particularly to applications of pure electric vehicles, there may even be a situation where a vehicle charges another vehicle having an almost equal power level, so it needs to provide more thorough protection against the changes in AC power. When the AC voltage suddenly becomes small, it needs to control the magnitude of the AC current, so as to avoid triggering protect due to excessive current. When the AC voltage suddenly becomes large, a corresponding control shall be conducted according to the charging situation of the bus capacitor. For example, after the bus capacitor is charged passively, the bus voltage is equal to the peak value of the AC voltage. At this time, if the impedance of suppressing inrush current is bypassed, and an AC voltage spike occurs, an inrush current without suppression to limit its value may occur in the next several power-frequency cycles, which is called as secondary inrush current in the present disclosure. In this case, the rectifying diodes will be subjected to a long time of high current, which may damage the device.

Figure 10:
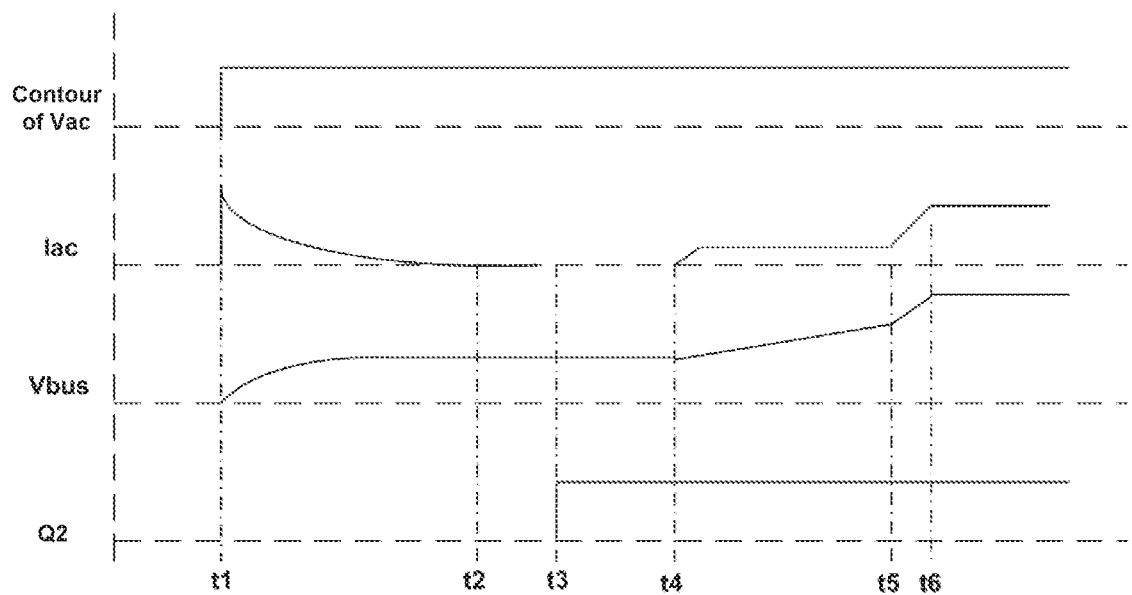
FIG. 10 is a timing chart of the operation of a module of suppressing inrush current when the power grid voltage is stable according to an embodiment of the present disclosure.

According to an embodiment of the present disclosure, an operation timing of the module of suppressing inrush current, when the power grid voltage Vac is stable, is proposed by utilizing the characteristic of fast action of MOSFET, as shown in FIG. 10. FIG. 10 is a timing chart of the operation of a module of suppressing inrush current when the power grid voltage is stable according to an embodiment of the present disclosure. As shown in FIG. 10, the uppermost curve is the contour or envelope of the AC voltage Vac, Iac is the AC current, Vbus is the bus voltage, and the lowermost curve is the driving voltage level of the controlled switch Q2, in which, Q2 is turned on under high voltage level, and turned off under low voltage level.

During the period from time t1 to time t2, when the AC voltage Vac is stable, its peak value is stable as well, and the on-board bidirectional charger receives AC power and charges the bus capacitor C1 by a limited current through the suppressor R1 of suppressing inrush current. During this charging period, the controlled switch Q2 is in an off-state, and the resistor R1 is connected to the charging circuit. The bus voltage Vbus gradually approaches the peak of the AC voltage as far as being equal to the peak of the AC voltage, and the charging is substantially completed at time t2. Through detecting by using the manner shown in FIG. 9, the relationship between the bus voltage Vbus and the AC voltage Vac can be determined. At time t3, the bypassing controlled switch Q2 of the module of suppressing inrush current is turned on. At time t4, the PFC-inverter module starts to charge the bus capacitor C1 by a constant current of a first AC current protection limit, and the voltage of the bus capacitor C1, which is equivalent to the bus voltage Vbus, is gradually increased. When the voltage Vbus of the bus capacitor C1 approaches a set closed-loop voltage at time t5, the first AC current protection limit is increased to a higher normal operation limit, that is, to a set charging current being greater than the first AC current protection limit, and the PFC voltage loop in the PFC-inverter module starts to work, to control the voltage Vbus of the bus capacitor C1 finally reaches the set voltage.

Figure 11:
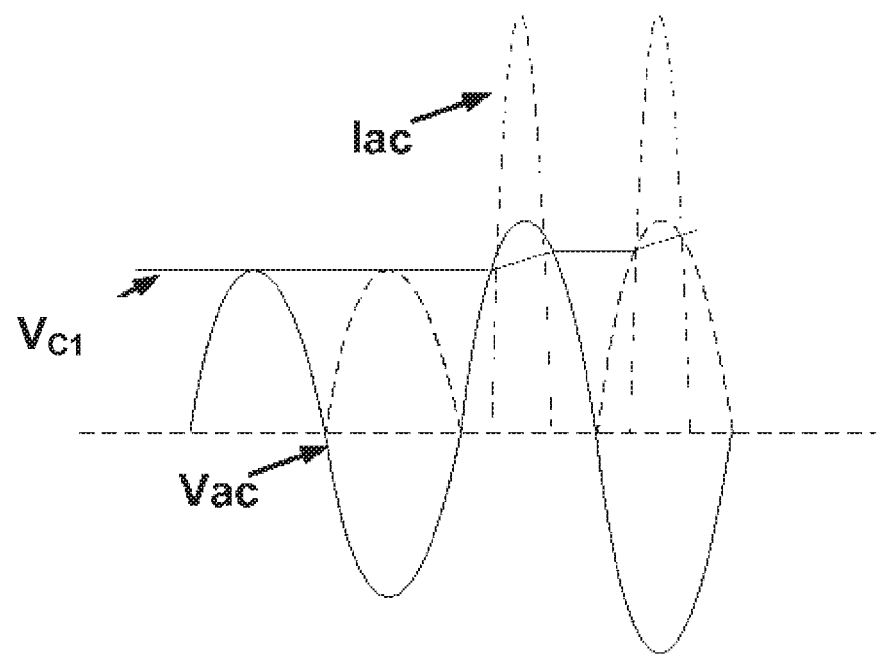
FIG. 11 is a schematic diagram of the relationship between the bus voltage and the AC voltage when the voltage of the bus capacitor is lower than the peak of the AC voltage and there is no measure to limit the value of the inrush current.

When a condition of sudden increase of the AC voltage Vac is encountered, if the bypassing controlled switch Q2 of the module of suppressing inrush current is turned on, and the voltage $V_{C1}$ of the bus capacitor C1 is lower than the peak value of the AC voltage Vac after the sudden increase, it will produce the circumstance as shown in FIG. 11. FIG. 11 is a schematic diagram of the relationship between the bus voltage and the AC voltage when the voltage of the bus capacitor is lower than the peak of the AC voltage and there is no measure to limit the value of the inrush current. As shown in FIG. 11, the AC power source may charge the bus capacitor C1 almost by an infinite current, that is, an extremely high current, which may damage the devices.

Figure 12:
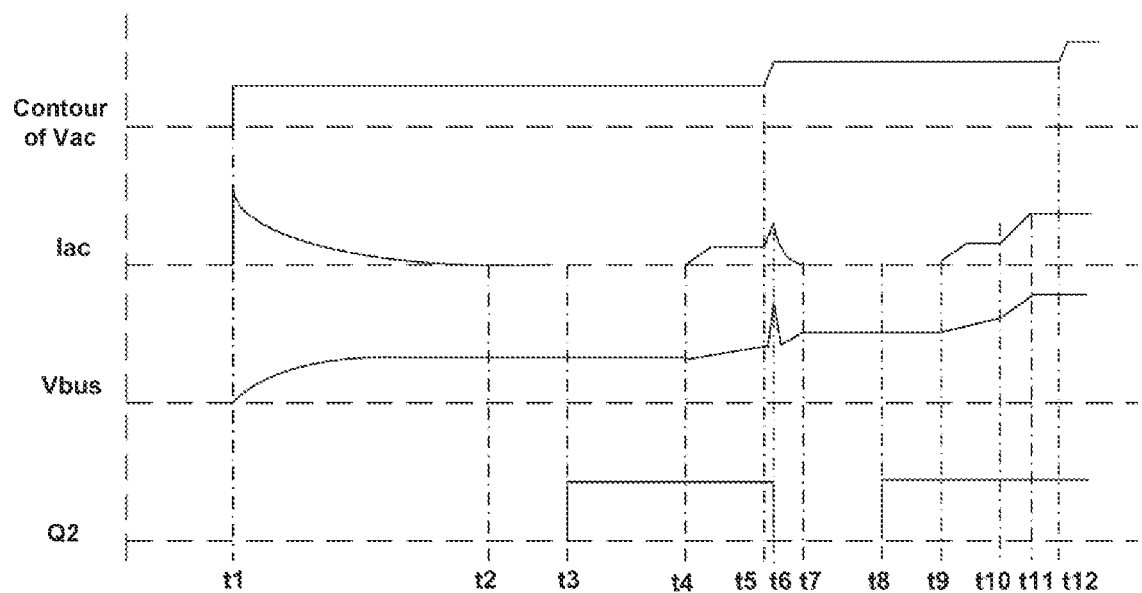
FIG. 12 is a timing chart of the operation of a module of suppressing inrush current when the power grid voltage fluctuates, according to an embodiment of the present disclosure.

According to an embodiment of the present disclosure, for the case where the AC voltage Vac is suddenly increased, a special control mode of protection as shown in FIG. 12 is introduced. FIG. 12 is a timing chart of the operation of a module of suppressing inrush current when the power grid voltage fluctuates, according to an embodiment of the present disclosure. As shown in FIG. 12, the control timing from time t1 to time t5 in FIG. 12 is similar to the control timing shown in FIG. 10. From time t1 to time t2, the AC power source charges the bus capacitor C1 through the module of suppressing inrush current, and the charging is ended at time t2. From this moment to the time when the voltage $V_{C1}$ of the bus capacitor C1 reaches its final voltage, a second AC current protection limit, which is slightly larger than the first AC current protection limit when the RFC-inverter module performs the charging by the constant current, is introduced. Once the current of the AC input exceeds the second AC current protection limit, the bypassing controlled switch Q2 of the impedance R1 of suppressing inrush current is turned off immediately, to avoid device damage caused by the arising of a possible sudden increase of the AC voltage Vac. For example, the AC voltage Vac rises suddenly at time t5, but at that time the voltage $V_{C1}$ of the bus capacitor C1 is only slightly higher than the last peak value of the AC voltage, then the peak value of the current AC voltage exceeds the voltage $V_{C1}$ of the bus capacitor C1, then the AC power supply will charge the bus capacitor C1 by a current without limit through the rectifying diodes, then AC current Iac rises quickly (see Iac in FIG. 11), then AC overcurrent protection is triggered at time t6, so the bypassing controlled switch Q2 is turned off immediately. Due to energy-storage function of inductors, the sudden increase of impedance of the DC bus will make the bus voltage Vbus suddenly increased. The second AC current protection limit shall be determined according to the bus voltage that the bus of the on-board bidirectional charger can withstand, that is, the sudden increase of voltage generated by the current of the second AC current protection limit flowing through the module of suppressing inrush current is lower than the voltage that the DC bus can withstand, and then the charging constant current Iac of the PFC-inverter module is determined according to the second AC current protection limit.

In FIG. 12, after the bypassing controlled switch Q2 is turned on, the AC power source charges the bus capacitor by a limited current limit from time t6 to time t7, then the charging ends at time t7, then the PFC-inverter module enters normal working logic again, then the bypassing controlled switch Q2 is turned on at time t8, and then the voltage of the bus capacitor reaches the instructed voltage at time t11. If sudden increase of the AC current occurs again at time t12, as long as the increase amplitude is within the specified range, it can be determined that the peak voltage of the AC voltage Vac is lower than the bus voltage Vbus, which cannot cause overcurrent, so no process is needed. The control timing from time t8 to time t12 is similar to the control timing from time t2 to time t6 in FIG. 10. Generally, after time t12, even if the situation that the peak voltage of the AC voltage Vac is suddenly higher than the bus voltage Vbus occurs, it is usually hard to maintain for a long time, and may not damage the charging module, so, at that time, even if AC current being overcurrent is triggered, there is no need to turn off the bypassing controlled switch Q2.

Figure 13:
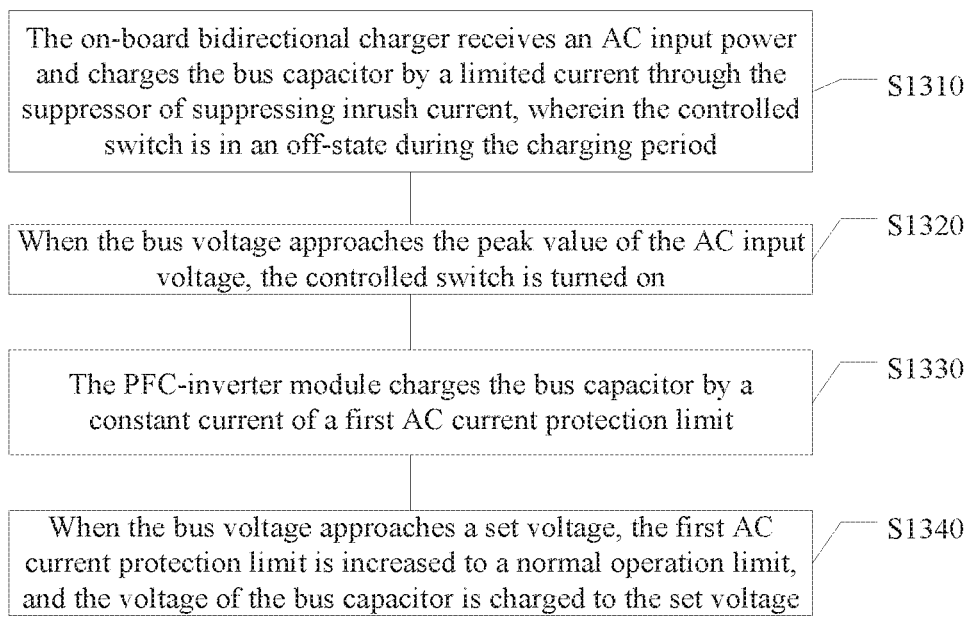
FIG. 13 is a flowchart of a method of controlling the module of suppressing inrush current of an on-board bidirectional charger according to an embodiment of the present disclosure.

According to an embodiment of the present disclosure, the present disclosure further provides a method of controlling the above module of suppressing inrush current of the on-board bidirectional charger. FIG. 13 is a flowchart of a method of controlling the module of suppressing inrush current of an on-board bidirectional charger according to an embodiment of the present disclosure. As shown in FIG. 13, the method includes the following steps:

S1310: the on-board bidirectional charger receives an AC input power and charges the bus capacitor by a limited current through the suppressor of suppressing inrush current, wherein the controlled switch is in an off-state during the charging period;

S1320: when the bus voltage approaches the peak value of the AC input voltage, the controlled switch is turned on;

S1330: the PFC-inverter module charges the bus capacitor by a constant current of a first AC current protection limit; and S1340: when the bus voltage approaches a set voltage, the first AC current protection limit is increased to a normal operation limit, that is, to a set charging current greater than the first AC current protection limit, and the voltage of the bus capacitor is charged to the set voltage.

Figure 14:
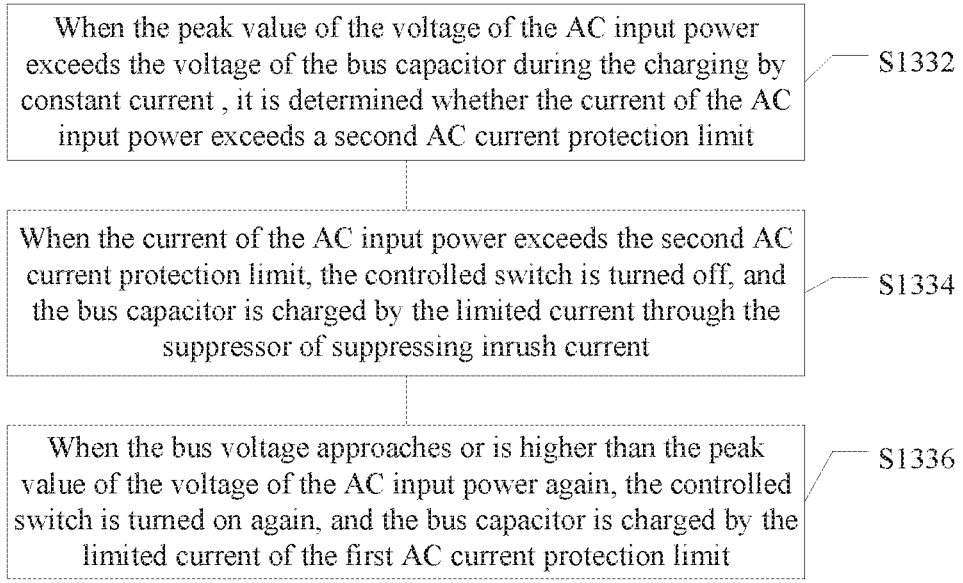
FIG. 14 is a flowchart of a method of controlling the module of suppressing inrush current of an on-board bidirectional charger according to another embodiment of the present disclosure.

FIG. 14 is a flowchart of a method of controlling the module of suppressing inrush current of an on-board bidirectional charger according to another embodiment of the present disclosure. Referring to the embodiment illustrated in FIG. 14, the step S1330 further includes the following steps:

S1332: when the peak value of the voltage of the AC input power exceeds the voltage of the bus capacitor during the charging by the constant current, it is determined whether the current of the AC input power exceeds a second AC current protection limit;

S1334: when the current of the AC input power exceeds the second AC current protection limit, the controlled switch is turned off, and the bus capacitor is charged by the limited current through the suppressor of suppressing inrush current; and S1336: when the bus voltage approaches or is higher than the peak value of the voltage of the AC input power again, the controlled switch is turned on again, and the bus capacitor is charged by the limited current of the first AC current protection limit.

Figure 15:
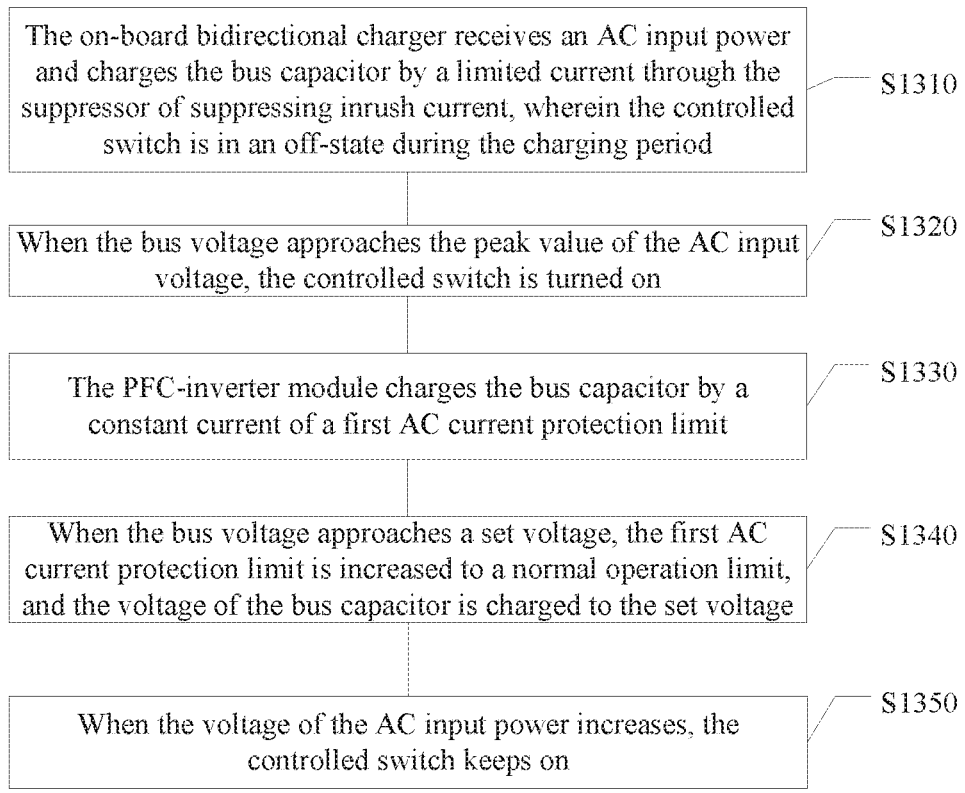
FIG. 15 is a flowchart of a method of controlling the module of suppressing inrush current of an on-board bidirectional charger according to further another embodiment of the present disclosure.

FIG. 15 is a flowchart of a method of controlling the module of suppressing inrush current of an on-board bidirectional charger according to further another embodiment of the present disclosure. According to the embodiment of the present disclosure as shown in FIG. 15, after the step S1340, the method further includes the step of:

S1350: when the voltage of the AC input power increases, the controlled switch keeps on.

Figure 16:
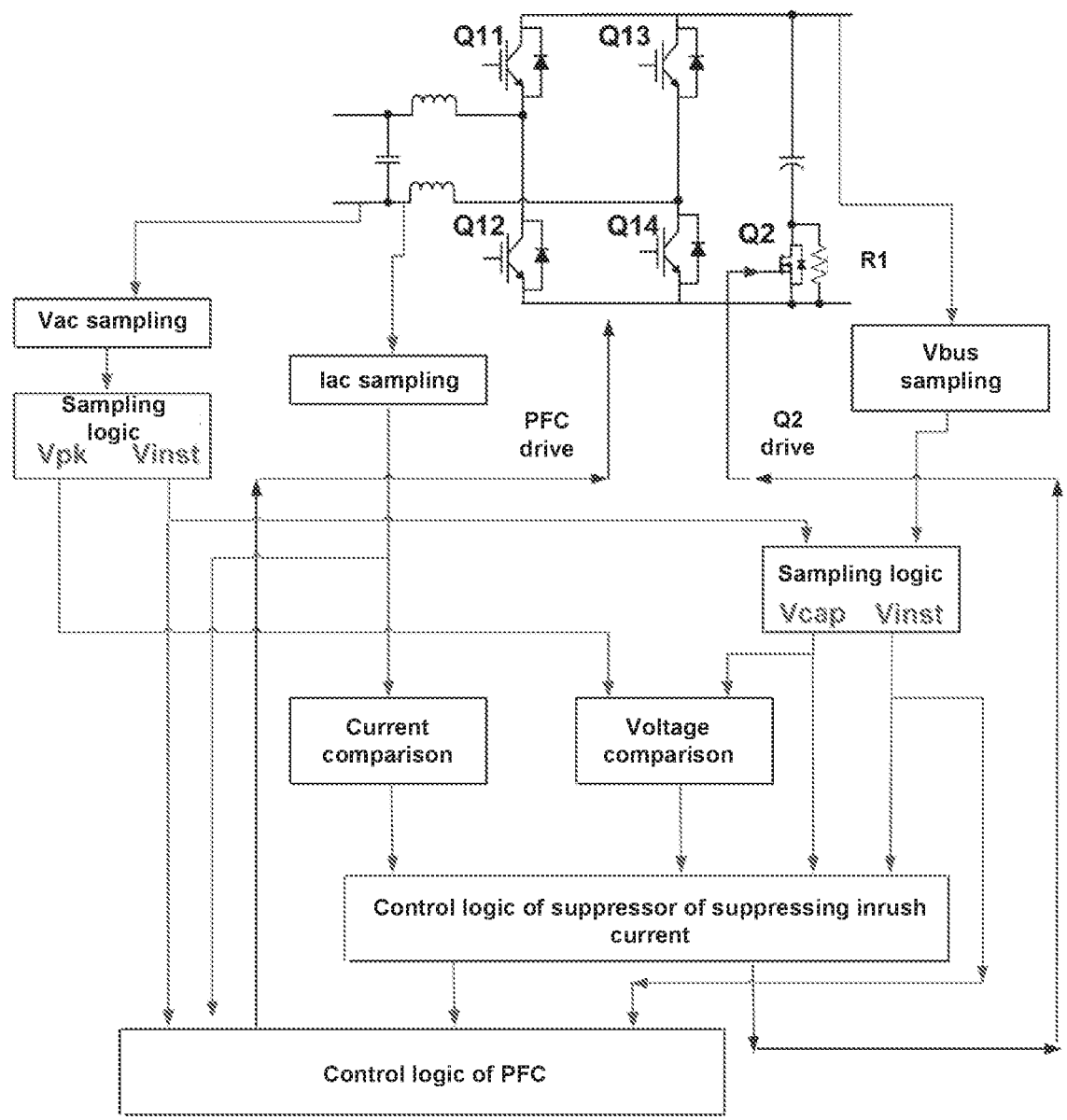
FIG. 16 is a logic block diagram corresponding to the operation timing of a module of suppressing inrush current when the power grid voltage is stable or fluctuated.

FIG. 16 is a logic block diagram corresponding to the above operation timing of a module of suppressing inrush current when the power grid voltage is stable or fluctuated.

As shown in FIG. 16, Vac is the AC voltage of the AC input obtained by the PFC-inverter module, Iac is the AC current, Vbus is the bus voltage, Vcap is the voltage of the bus capacitor, Vpk is the peak voltage of the AC input, and Vinst is the set voltage of the bus capacitor, wherein the flow directions of signals are as shown in this figure, for the respective steps or actions, the above related description can be referred to.

Figure 17:
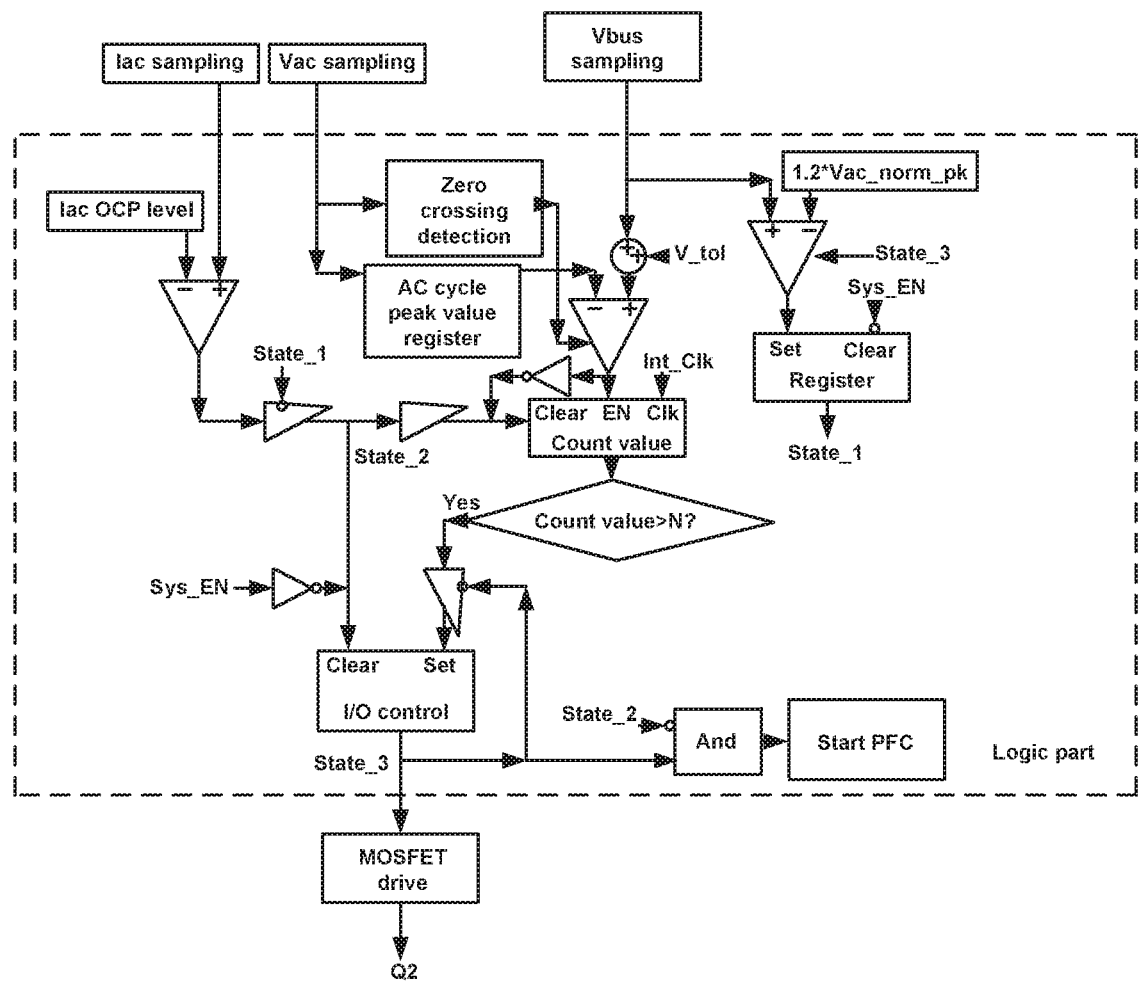
FIG. 17 is a control block diagram corresponding to the operation timing of a module of suppressing inrush current when the power grid voltage is stable or fluctuated.

FIG. 17 is a control block diagram corresponding to the above operation timing of a module of suppressing inrush current when the power grid voltage is stable or fluctuated.

As shown in FIG. 17, V_tol is an increase tolerance of the voltage comparison value defined by an designer (used to determine whether the voltage is suddenly increased);

1.2*Vac_norm_pk is 1.2 times of the peak value of the normal-operating AC voltage. Here, the threshold is taken by 20%, but other thresholds can be taken as well. When determining whether to perform AC overcurrent protection, it needs first to detect whether the AC voltage exceeds the threshold and then detect whether the AC current exceeds the second AC current protection limit which is slightly greater than the preceding first AC current protection limit. For AC input, the voltage/current instantaneous values or average values at present can be compared with that at the moment of the last power-frequency cycle;

State_1 is the state of the logic control part. When it is true, the normal operating peak value of Iac is compared with the output value that can be protected against secondary inrush current;

State_2 is the OCP (overcurrent protection) protection state. When it is true, the MOSFET is driven to be the off-state and the PFC is shut down;

State_3 is the state of MOSFET. When it is true, a comparison between the current value and a set value of the bus voltage Vbus is initiated; and Sys_EN is an enable signal from the system.

The flow directions of signals are as shown in FIG. 17, for the respective steps or actions, the above related description can be referred to.

By adopting the module of suppressing inrush current, the method of controlling the module of suppressing inrush current and the on-board bidirectional charger using the module of suppressing inrush current, the charging and inverting circuits are fully multiplexed, which can improve power density and circuit efficiency of charging and inversion, realize isolation function including reducing EMI electromagnetic interference and reducing switching interference signals, realize more convenient buck/boost functions, improve using life and performance of devices, reduce cost, and reduce the size of equipment. Particularly, the solution of the present disclosure can provide protection against secondary inrush current for the on-board bidirectional charger in the case of complicated environment of power grid.

The present disclosure has been described by the above related embodiments, but the above embodiments are merely examples for implementing the present disclosure. It must be noted that the disclosed embodiments do not limit the scope of the disclosure. On the contrary, all changes and refinements made without departing from the spirit and scope of the present disclosure are within the scope of patent protection of the present disclosure.

What is claimed is:

1. A method of controlling a module of suppressing inrush current used in an on-board bidirectional charger, wherein:
    the on-board bidirectional charger comprises a PFC-inverter module configured to convert an AC power into a DC power or convert the DC power into the AC power, the PFC-inverter module is connected to an AC input, a positive DC bus and a negative DC bus of the on-board bidirectional charger, and the PFC-inverter module comprises a bus capacitor connected between the positive DC bus and the negative DC bus; and the module of suppressing inrush current is connected in series with the bus capacitor between the positive DC bus and the negative DC bus, and the module of suppressing inrush current comprises a controlled switch and a suppressor of suppressing inrush current connected in parallel with the controlled switch, and the method comprises:
    controlling the on-board bidirectional charger to receive an AC input power and charge the bus capacitor by a limited current through the suppressor of suppressing inrush current, wherein the controlled switch is in an off-state during the charging;
    when a voltage of the bus approaches a peak value of a voltage of the AC input power, turning on the controlled switch;
    controlling the PFC-inverter module to charge the bus capacitor by a constant current of a first AC current protection limit; and
    when the voltage of the bus approaches a set voltage, increasing the first AC current protection limit to a normal operation limit, and charging a voltage of the bus capacitor to the set voltage.

2. The method according to claim 1, wherein the step of charging the bus capacitor by a constant current of a first AC current protection limit further comprises:
    when the peak value of the voltage of the AC input power exceeds the voltage of the bus capacitor during the charging by the constant current, determining whether the current of the AC input power exceeds a second AC current protection limit;
    when the current of the AC input power exceeds the second AC current protection limit, turning off the controlled switch, and charging the bus capacitor by the limited current through the suppressor of suppressing inrush current; and
    when the voltage of the bus approaches or is higher than the peak value of the voltage of the AC input power again, turning on the controlled switch again, and charging the bus capacitor by the limited current of the first AC current protection limit.

3. The method according to claim 2, wherein the second AC current protection limit is higher than the first AC current protection limit.

4. The method according to claim 2, wherein a voltage generated by a current of the second AC current protection limit flowing through the module of suppressing inrush current is lower than a voltage that the DC bus can withstand.

5. The method according to claim 3, wherein, after the step of charging a voltage of the bus capacitor to the set voltage, the method further comprises:
    when the voltage of the AC input power increases, keeping the controlled switch on.

6. An on-board bidirectional charger, comprising:
    a PFC-inverter module, configured to convert an AC power into a DC power or convert the DC power into the AC power, the PFC-inverter module is connected to an AC input, a positive DC bus and a negative DC bus of the on-board bidirectional charger, and the PFC-inverter module comprises a bus capacitor connected between the positive DC bus and the negative DC bus;
    a module of suppressing inrush current, configure to suppressing inrush current when the bus capacitor of the on-board bidirectional charger is charged, the module of suppressing inrush current is connected in series with the bus capacitor between the positive DC bus and the negative DC bus, and the module of suppressing inrush current comprises a controlled switch and a suppressor of suppressing inrush current connected in parallel with the controlled switch, wherein the suppressor of suppressing inrush current is a positive temperature coefficient resistor;

a sampling and encoding module, configured to acquire a voltage and a current of an AC input power from the PFC-inverter module, and to acquire a voltage of the bus from the module of suppressing inrush current;

an isolator, configured to isolate signals acquired from the sampling and encoding module; and a controller, configured to control the controlled switch in the module of suppressing inrush current, based on signals acquired from the isolator.

7. The on-board bidirectional charger according to claim 6, further comprising:

a bidirectional resonant zero voltage switching DC/DC module, configured to boost or buck a voltage from the positive DC bus and the negative DC bus or a voltage from an on-board battery, wherein the bidirectional resonant zero voltage switching DC/DC module is connected to the positive DC bus, the negative DC bus and a positive terminal and a negative terminal of the on-board battery.

8. The on-board bidirectional charger according to claim 6, wherein the controlled switch is a transistor.

9. The on-board bidirectional charger according to claim 8, wherein the transistor is a MOSFET.

10. The on-board bidirectional charger according to claim 9, the MOSFET is a SiC MOSFET or GaN MOSFET.

11. The on-board bidirectional charger according to claim 7, wherein the bidirectional resonant zero voltage switching DC/DC module comprises:

a transformer comprising a primary winding and a secondary winding;

at least one primary-side bridge-arms, wherein a DC positive input terminal of each of the primary-side bridge-arms is connected to the positive DC bus, a DC negative input terminal of each of the primary-side bridge-arms is connected to the negative DC bus, and a midpoint of each of the primary-side bridge-arms is connected to a corresponding terminal of the primary winding of the transformer;

at least one secondary-side bridge-arms, wherein a DC positive output terminal of each of the secondary-side bridge-arms is connected to a positive terminal of the on-board battery, and a DC negative output terminal of each of the secondary-side bridge-arms is connected to a negative terminal of the on-board battery, and a midpoint of each of the secondary-side bridge-arms is connected to a corresponding terminal of the secondary winding of the transformer; and at least one resonant tank, connected in series between the primary winding of the transformer and the midpoint of at least one of the primary-side bridge-arms, or between the secondary winding of the transformer and the midpoint of at least one of the secondary-side bridge-arms.

12. The on-board bidirectional charger according to claim 7, wherein the on-board bidirectional charger comprises a plurality of bidirectional resonant zero voltage switching DC/DC modules connected in parallel.

13. The on-board bidirectional charger according to claim 11, wherein a resonant capacitor is connected in series between the midpoint of one of the primary-side bridge-arms and the primary winding of the transformer, and another resonant capacitor is connected in series between the midpoint of one of the secondary-side bridge-arms and the secondary winding of the transformer.

14. The on-board bidirectional charger according to claim 6, wherein the controller communicates with a vehicle controller via an isolated CAN module.

* * * * *